(12) United States Patent
Carnahan

(10) Patent No.: US 12,527,251 B2
(45) Date of Patent: Jan. 20, 2026

(54) RADIAL FREQUENCY OF CLIP CONTROL SYSTEM

(71) Applicant: DEERE & COMPANY, Moline, IL (US)

(72) Inventor: Bryce A. Carnahan, Chapel Hill, NC (US)

(73) Assignee: DEERE & COMPANY, Moline, IL (US)

( * ) Notice: Subject to any disclaimer, the term of this patent is extended or adjusted under 35 U.S.C. 154(b) by 653 days.

(21) Appl. No.: 17/938,103

(22) Filed: Oct. 5, 2022

(65) Prior Publication Data

US 2024/0114825 A1 Apr. 11, 2024

(51) Int. Cl.
*A01D 34/44* (2006.01)
*A01D 34/00* (2006.01)
*A01D 34/58* (2006.01)
*A01D 101/00* (2006.01)

(52) U.S. Cl.
CPC .......... *A01D 34/006* (2013.01); *A01D 34/44* (2013.01); *A01D 34/58* (2013.01); *A01D 2101/00* (2013.01)

(58) Field of Classification Search
CPC ...... A01D 34/006; A01D 34/44; A01D 34/58; A01D 2101/00
See application file for complete search history.

(56) References Cited

U.S. PATENT DOCUMENTS

| | | | |
|---|---|---|---|
| 5,406,778 | A | 4/1995 | Lamb et al. |
| 6,082,084 | A | 7/2000 | Reimers et al. |
| 7,610,738 | B2 | 11/2009 | Daly et al. |
| 7,954,308 | B2 | 6/2011 | Harris |
| 8,621,833 | B2 | 1/2014 | Shida et al. |
| 9,179,596 | B2 | 11/2015 | Phillips et al. |
| 9,635,809 | B2 | 5/2017 | Iyasere et al. |
| 10,264,726 | B2 | 4/2019 | Henson |
| 2007/0295545 | A1 | 12/2007 | Romig et al. |
| 2019/0075720 | A1 | 3/2019 | Billich |
| 2020/0245560 | A1 | 8/2020 | Legault et al. |
| 2022/0192097 | A1* | 6/2022 | Teraoka .................. A01D 75/28 |

FOREIGN PATENT DOCUMENTS

WO   WO 9728681 A2   8/1997
WO   WO 2020160124 A1   8/2020

OTHER PUBLICATIONS

Great Britain Combined Search and Examination Report issued in application No. GB2313209.5 dated Feb. 22, 2024, 06 pages.

* cited by examiner

*Primary Examiner* — Mathew Franklin Gordon

(57) ABSTRACT

A radial frequency of clip control system includes a steering angle sensor for a steerable rear wheel of a grass mowing machine, a pedal sensor for sensing an operator input for a desired ground speed at a reference point adjacent an operator seat on the grass mowing machine; and an electronic controller that uses the desired ground speed and location of each of a plurality of reel cutting units to calculate a rotational speed for each of the plurality of reel cutting units.

10 Claims, 2 Drawing Sheets ically, to a radial frequency of clip control
system for grass mowing machines with a plurality of reel
cutting units such as triplex greensmowers.

BACKGROUND OF THE INVENTION

Grass mowing machines used to mow golf courses, parks, and athletic fields where a high quality of cut is desired, may include three or more reel cutting units. For example, triplex greensmowers have two forward reel cutting units followed by a center or rear reel cutting unit positioned under the vehicle frame and the operator station. Reel cutting units have front and rear rollers, spiral cutting blades rotating in close proximity to a bedknife, and may have a removable grass catcher mounted in front of the cutting unit. For example, a reel cutting unit may have 8 spiral cutting blades.

Frequency of clip is the distance traveled by a cutting reel between consecutive clips by the spiral cutting blades. The frequency of clip may depend on the number of blades on the reel, the reel rotational speed or rpm, and the travel or ground speed of the greensmower or other vehicle. If frequency of clip is not within a specified range, there may be negative effects. For example, if frequency of clip is too slow, the grass may have a rippled effect sometimes referred to as marcelling or wash boarding. If frequency of clip is too fast, the grass may be over stressed and develop stripes and/or brown tips, and the reel cutting unit also may experience accelerated component wear.

In the past, some greensmowers have use the desired vehicle mow speed to calculate frequency of clip, which results in the same reel rotational speed or rpm value commanded to all of the reel cutting units. However, during turns, reel cutting units that are offset from the vehicle centerline will travel along the ground at a larger or smaller radius compared to the vehicle centerline. Those reel cutting units will travel faster or slower than the vehicle, and will have a larger or smaller frequency of clip.

There is a need for a radial frequency of clip control system that provides the same frequency of clip for reel cutting units when mowing in a straight line or turning. There is a need for a radial frequency of clip control system that provides the same frequency of clip for a plurality of reel cutting units that travel along the ground at a larger or smaller radius compared to the vehicle centerline.

SUMMARY OF THE INVENTION

A radial frequency of clip control system includes a controller that provides a plurality of different rotational speed commands to a plurality of reel cutting units based on a sensor input for a turning angle of a steerable rear wheel of a grass mowing machine and a calculated distance of each reel cutting unit to an instantaneous turn center.

DESCRIPTION OF PREFERRED EMBODIMENT

Figure 1:
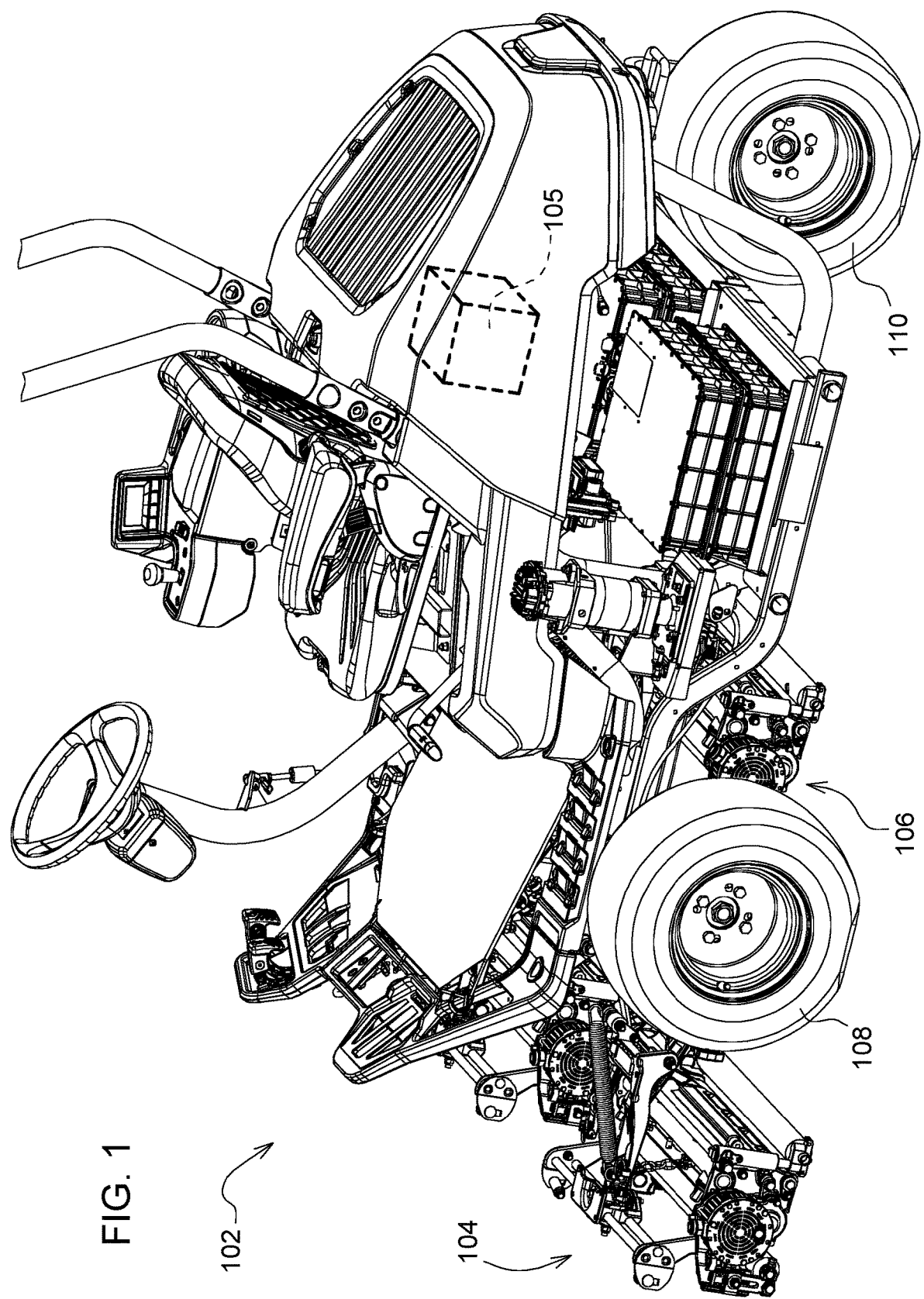
FIG. 1 is a top view of a triplex greensmower with a radial frequency of clip control system according to a first embodiment.

FIG. 1 shows triplex greensmower 102 having a radial frequency of clip control system that provides the same frequency of clip for a plurality of reel cutting units, when mowing in a straight line and when turning. The triplex greensmower may include left and right front reel cutting units 104 positioned side-by-side forwardly of left and right drive wheels 108, and center or rear reel cutting unit 106 positioned behind the drive wheels and in front of steerable rear wheel 110. An electric motor may drive each cutting reel and may be mounted to one side of each reel cutting unit. The left and right front drive wheels may be driven by electric motors. Optionally, the steerable rear or center wheel also may be driven by an electric motor. While the radial frequency of clip control system is shown on a triplex greensmower, the system also may be used on other grass mowing machines having a plurality of reel cutting units. For example, the radial frequency of clip control system also may be used on fairway mowers having 5 or 7 reel cutting units. There is no limitation of the number of reel cutting units.

Figure 2:
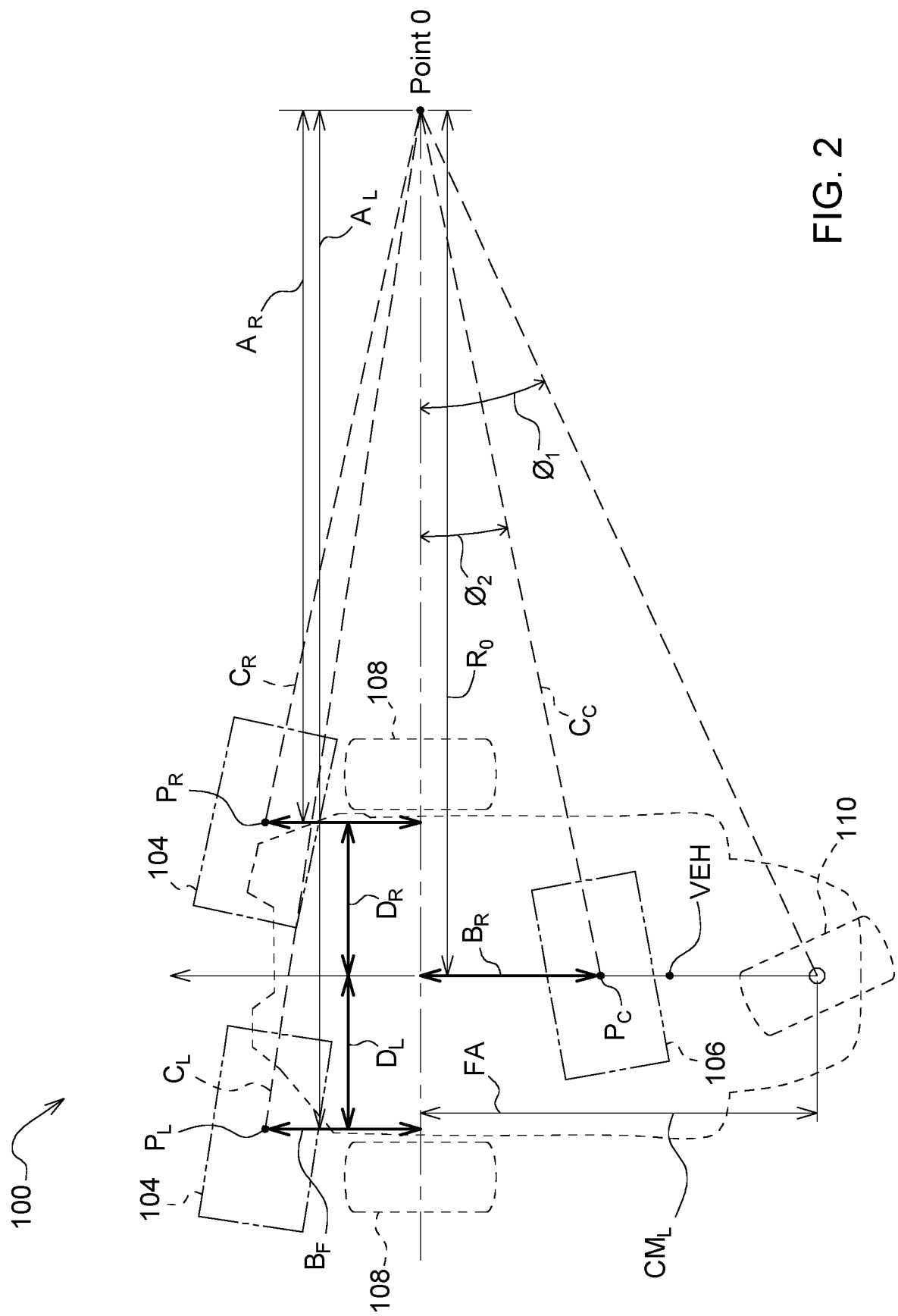
FIG. 2 is a schematic diagram of radial frequency of clip control system for a triplex greensmower according to a first embodiment.

In one embodiment, radial frequency of clip control system 100 may include a sensor input to controller 105 for the angle $\phi_1$ of steerable rear wheel 110. The controller may use angle $\phi_1$ to determine the location of point 0, the instantaneous turn center of the triplex greensmower or other grass mowing machine. In FIG. 2, point 0 is shown as the instantaneous turn center extending from the steerable rear wheel and the front drive wheel axis.

In one embodiment, radial frequency of clip control system 100 may include a pedal input to the controller for desired ground speed $V_{veh}$ at reference point VEH. Reference point VEH may be located anywhere on the centerline of a triplex greensmower or other grass mowing machine, rearward of front wheel axis FA. To minimize centrifugal force and improve operator feel, reference point VEH may be located near the operator seat. For example, the grass mowing machine may include a display or input device to the controller, which the operator may use to enter the desired location of VEH, or move the location forward or rearward.

In one embodiment, the radial frequency of clip control system may include a controller that calculates the ground speed $V_{FA}$ at the centerline of the front drive wheel axis, based on desired ground speed $V_{veh}$ at reference point VEH, and angle $\phi_2$ from VEH to point 0. To calculate the ground speed $V_{FA}$ at the centerline of the front drive wheel axis, the controller may use the equation $V_{FA}=\cos(\phi_2)*V_{veh}$.

In one embodiment, the radial frequency of clip control system may include a reference point on each of the plurality of reel cutting units. For example, FIG. 2 shows reference points $P_L$ on left front reel cutting unit, $P_R$ on right front reel cutting unit, and $P_C$ on center or rear cutting unit. The controller may store the distance from each reference point to the front drive wheel axis. For example, FIG. 2 shows $B_F$ as the distance from $P_L$ or $P_R$ to front drive wheel axis FA; and $B_C$ as the distance from $P_C$ to front drive wheel axis FA. The controller also may store the distance from each reference point to the grass mowing machine centerline. For example, FIG. 2 shows $D_L$ and $D_R$ as the distance from $P_L$ or $P_R$ to the mower centerline; and $P_C$ is located on the mower centerline. Additionally, the controller may store $CM_L$ as the distance from the front drive wheel axis to the rear steerable wheel axis.

In one embodiment, the radial frequency of clip control system may include a controller that calculates the distance from the reference point on each reel cutting unit to point 0, the instantaneous turn center. The controller first may calculate $R_0$, the distance from the mower centerline to point 0, using the equation $R_0=CM_L*\tan(\phi_1)$; $A_L$, the distance parallel to the front axis from reference point $P_L$ to point 0, using the equation $A_L=R_0+D_L$; and $A_R$, the distance parallel to the front axis from reference point $P_R$ to point 0, using the equation $A_R=R_0-D_R$. The controller then may calculate $C_L$, the distance from reference point $P_L$ to point 0, using the equation $C_L=\sqrt{A_L^2+B_F^2}$, $C_R$, from reference point $P_R$ to point 0, using the equation $C_R=\sqrt{A_R^2+B_F^2}$, and $C_C$, from reference point $P_C$ to point 0, using the equation $C_C=\sqrt{R_O^2+B_R^2}$.

In one embodiment, the radial frequency of clip control system may include a controller that calculates the rotational speed of each reel cutting unit to maintain the same specified frequency of clip when turning. The rotational speed of each reel cutting unit may be based on the distance from the reference point on each reel cutting unit to point 0, the instantaneous turn center. The controller can adjust the rotational speed of each reel to maintain the desired frequency of clip when turning. For example, the controller may calculate the rotational speed OR of the right front reel cutting unit using the equation $\omega_R=(C_R/R_0)*(V_{FA}*1056)/(FOC*\#Blades)$; the rotational speed $\omega_L$ of the left front reel cutting unit using the equation $\omega_L=(C_L/R_0)*(V_{FA}*1056)/(FOC*\#Blades)$; and the rotational speed $\omega_C$ of the center or rear reel cutting unit using the equation $\omega_C=(C_C/R_0)*(V_{FA}*1056)/(FOC*\#Blades)$.

The radial frequency of clip control system includes a controller that provides the same frequency of clip for all reel cutting units, when mowing in a straight line and when turning. The controller commands the speed for each reel cutting unit based on the distance of the reel cutting unit to point 0, the instantaneous turn center of the mower.

Having described the preferred embodiment, it will become apparent that various modifications can be made without departing from the scope of the invention as defined in the accompanying claims.

The invention claimed is:

1. A radial frequency of clip control system, comprising: a controller that provides a plurality of different rotational speed commands to a plurality of reel cutting units based on a sensor input for a turning angle of a steerable rear wheel of a grass mowing machine and a calculated distance of each reel cutting unit to an instantaneous turn center of the grass mowing machine.

2. The radial frequency of clip control system of claim 1 wherein each reel cutting unit is rotated by an electric motor.

3. The radial frequency of clip control system of claim 1 wherein the distance to the instantaneous turn center is calculated using a reference point on each reel cutting unit.

4. The radial frequency of clip control system of claim 1 wherein the rotational speed commands to the plurality of reel cutting units provide a specified frequency of clip.

5. A radial frequency of clip control system, comprising the steps of:
sensing a steering angle of a steerable rear wheel on a triplex greensmower;
sensing a pedal input for a desired speed at a reference point on the triplex greensmower;
providing reel rotational speed commands to each of a plurality of reel cutting units, the rotational speed commands being a function of the sensed steering angle, the sensed pedal input, the location of the reference point, and at least one dimension of the triplex greensmower.

6. The radial frequency of clip control system of claim 5 wherein the reference point is adjacent an operator seat on the triplex greensmower.

7. The radial frequency of clip control system of claim 5 wherein at least one dimension of the triplex greensmower is stored in controller memory.

8. A radial frequency of clip control system, comprising:
a steering angle sensor for a steerable rear wheel on a grass mowing machine;
a pedal sensor for sensing an operator input for a desired ground speed at a reference point adjacent an operator seat on the grass mowing machine; and
an electronic controller that uses the desired ground speed and location of each of a plurality of reel cutting units to calculate a rotational speed for each of the plurality of reel cutting units.

9. The radial frequency of clip control system of claim 8 wherein the reference point is located on a centerline of the grass mowing machine.

10. The radial frequency of clip control system of claim 8 further including an electric motor rotating each of the plurality of reel cutting units.

* * * * *